United States Patent
Holden

(10) Patent No.: US 6,659,726 B2
(45) Date of Patent: Dec. 9, 2003

(54) VARIABLE SPEED CONTROL OF MULTIPLE MOTORS

(75) Inventor: Steve Holden, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/307,689

(22) Filed: Dec. 2, 2002

(65) Prior Publication Data

US 2003/0123989 A1 Jul. 3, 2003

Related U.S. Application Data

(63) Continuation-in-part of application No. 10/029,822, filed on Dec. 31, 2002, now Pat. No. 6,579,067.

(51) Int. Cl.[7] .............................................. F04B 41/06
(52) U.S. Cl. ............................. 417/2; 417/3; 417/426; 417/429
(58) Field of Search ............................ 417/2, 3, 426, 417/429

(56) References Cited

U.S. PATENT DOCUMENTS

| | | | | |
|---|---|---|---|---|
| 3,584,977 A | * | 6/1971 | Coleman et al. ............... | 417/53 |
| 3,817,658 A | * | 6/1974 | Murase ........................... | 417/2 |
| 3,850,123 A | * | 11/1974 | LaRocca et al. .............. | 72/17.1 |
| 4,765,284 A | * | 8/1988 | Kanazawa et al. ........ | 123/41.49 |
| 5,259,731 A | * | 11/1993 | Dhindsa et al. ................ | 417/3 |
| 5,343,970 A | * | 9/1994 | Severinsky ................. | 180/65.2 |
| 5,511,127 A | * | 4/1996 | Warnaka ..................... | 381/71.5 |
| 5,742,500 A | * | 4/1998 | Irvin .............................. | 700/9 |
| 5,797,729 A | * | 8/1998 | Rafuse et al. .................. | 417/3 |
| 6,045,331 A | * | 4/2000 | Gehm et al. ................... | 417/2 |
| 6,056,510 A | * | 5/2000 | Miura et al. ................... | 417/2 |
| 6,257,832 B1 | * | 7/2001 | Lyszkowski et al. .......... | 417/2 |
| 6,579,067 B1 | * | 6/2003 | Holden .......................... | 417/2 |

* cited by examiner

Primary Examiner—Cheryl J. Tyler
Assistant Examiner—William H. Rodriguez

(57) ABSTRACT

A system for variable speed control of a plurality of motors under variable load demand is provided. The system includes a constant power source and a plurality of motors having electrical circuits with switches to connect with the constant power source. The system further includes a variable speed drive for driving each of the plurality of motors at variable speed, wherein each of the plurality of motors includes a switch to connect with the variable speed drive. Each of the plurality of motors is selectively electrically connected with the variable speed drive and the constant power source via the switches, for driving the each of the plurality of motors at one of variable and constant speed in response to load demands. To prevent short cycling of the motors under situations of increasing system demand, the control algorithm for the electrical switches provides hysteresis by overspeeding one of the motors before switching from variable speed mode to constant speed mode. Similarly, hysteresis is included in the control algorithm to prevent short cycling of the motors under situations of decreasing system demand.

8 Claims, 2 Drawing Sheets

… (US 6,659,726 B2)

VARIABLE SPEED CONTROL OF MULTIPLE MOTORS

RELATED APPLICATIONS

This is a continuation in part of the patent application having a filing date of Dec. 31, 2002 and Ser. No. 10/029,822, now (U.S. Pat. No. 6,579,067).

TECHNICAL FIELD

This invention is directed to motor control and more particularly to variable speed control of multiple air conditioning and refrigeration compressors.

BACKGROUND OF THE INVENTION

Variable speed control of a motors, and more particularly, compressor motors in a refrigeration or air conditioning application is often accomplished using a variable speed drive. This allows the removal of all unloading hardware from the compressor system. In typical applications involving more than one compressor, such as multiple circuit chillers, multiplexed compressor chillers, refrigeration, a variable speed control could be used with each compressor to selectively unload compressors as necessary based on system demand. Variable speed drives are expensive and therefore, multiple compressor systems requiring multiple variable speed drives also become extensively more expensive. In addition, the need for multiple variable speed drives adds to the complexity and size of the air conditioning or refrigeration system.

There exists a need therefore, for a solution which allows for the reduction in the number of variable speed drives required for multi-motor or multi-compressor systems so as to reduce cost and system complexity.

SUMMARY OF THE INVENTION

An object of this invention is to provide a multiple motor, and particularly multiple compressor system, having a single variable speed drive for unloading the motors or compressor motors.

Another object of this invention is to provide a lower cost, less complex variable speed compressor systems with multiple compressors and motors, having a single variable speed drive.

Yet another object of the following invention is to provide a mechanism for maintaining the desired combined load during the unloading of one compressor motor to line power and loading of a second to variable speed, while accounting for the time to speed of the second motor.

In accordance with foregoing objects and following advantages, a system for variable speed control of a plurality of motors under variable load demand is provided. The system includes a constant power source and a plurality of motors having electrical circuits with switches to connect with the constant power source. The system further includes a variable speed drive for driving each of the plurality of motors at variable speed, wherein each of the plurality of motors includes a switch to connect with the variable speed drive. Each of the plurality of motors is selectively electrically connected with the variable speed drive and the constant power source via the switches, for driving the each of the plurality of motors at one of variable and constant speed in response to load demands. To prevent short cycling of the motors under situations of increasing system demand, the control algorithm for the electrical switches provides hysteresis by overspeeding one of the motors before switching from variable speed mode to constant speed mode. Similarly, hysteresis is included in the control algorithm to prevent short cycling of the motors under situations of decreasing system demand.

BRIEF DESCRIPTION OF THE DRAWINGS

For a fuller understanding of the present invention, reference should now be made to the following detailed description of various embodiments thereof taken in conjunction with the accompanying drawings wherein.

DESCRIPTION OF THE PREFERRED EMBODIMENTS

Figure 1:
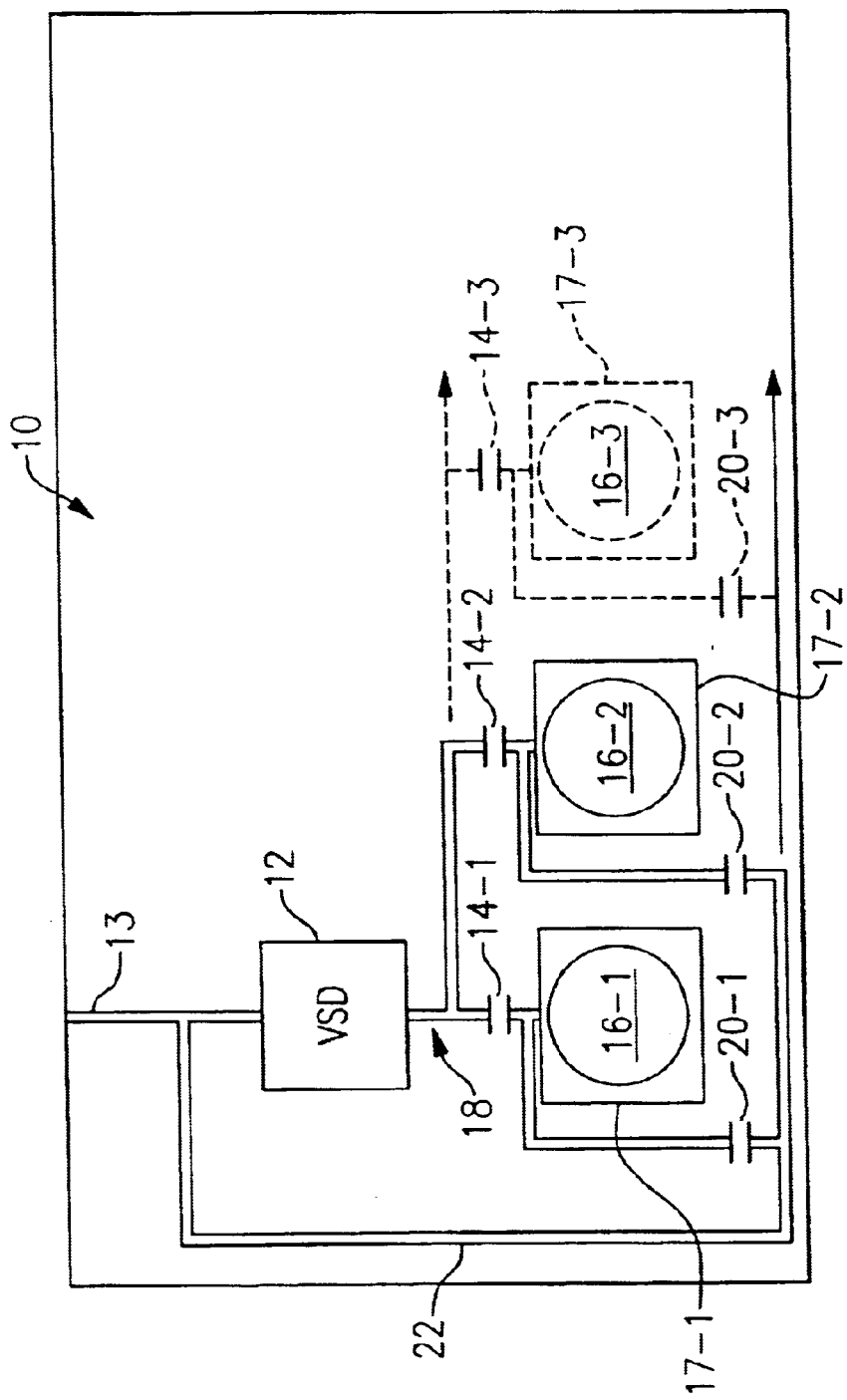
FIG. 1 is a schematic diagram of the control circuit of the present invention indicating one variable speed drive driving multiple compressor motors.

Referring now to the drawings in detail, there is shown in the FIG. 1, a schematic diagram of the control circuit and system of the present invention, designated generally as 10. The system includes a single Variable Speed Drive (VSD) 12, power line 13 to VSD 12, multiple switches 14-1, 14-2, 14-3, connecting VSD 12 with multiple motors 16-1, 16-2, and 16-3, respectively of compressors 17-1, 17-2, and 17-3.

As shown, via an electric circuit 18, VSD 12 is connected with multiple motors, and particularly compressor motors with switches 14 but circuit 18 functions to place only one motor on the VSD at a time. In this manner variable loads and a wide load range can be managed. That is, when the load exceeds the capacity of a single motor, that motor is taken off the VSD and is run full load or fixed speed in the circuit, on line power, and then another compressor is started on VSD power to provide the additional cooling capacity.

Switches 20-1, 20-2 and 20-3 are provided to place the compressor motors removed from VSD power, onto line or constant power 22. For Example, to remove motor 16-1 from VSD control, switch 14-1 is opened, and switch 20-1 is closed, placing motor 16-1 on line power 22. The VSD power can then be applied to any other motor in the system by closing the switches 14. It is important to ensure that the system is properly protected so that the switches (for example 14-1 and 20-1) to any one motor cannot be closed simultaneously. It is also important that the system is properly protected so that the switches 14 for VSD power also cannot be closed in a manner that will overload the VSD.

Figure 2:
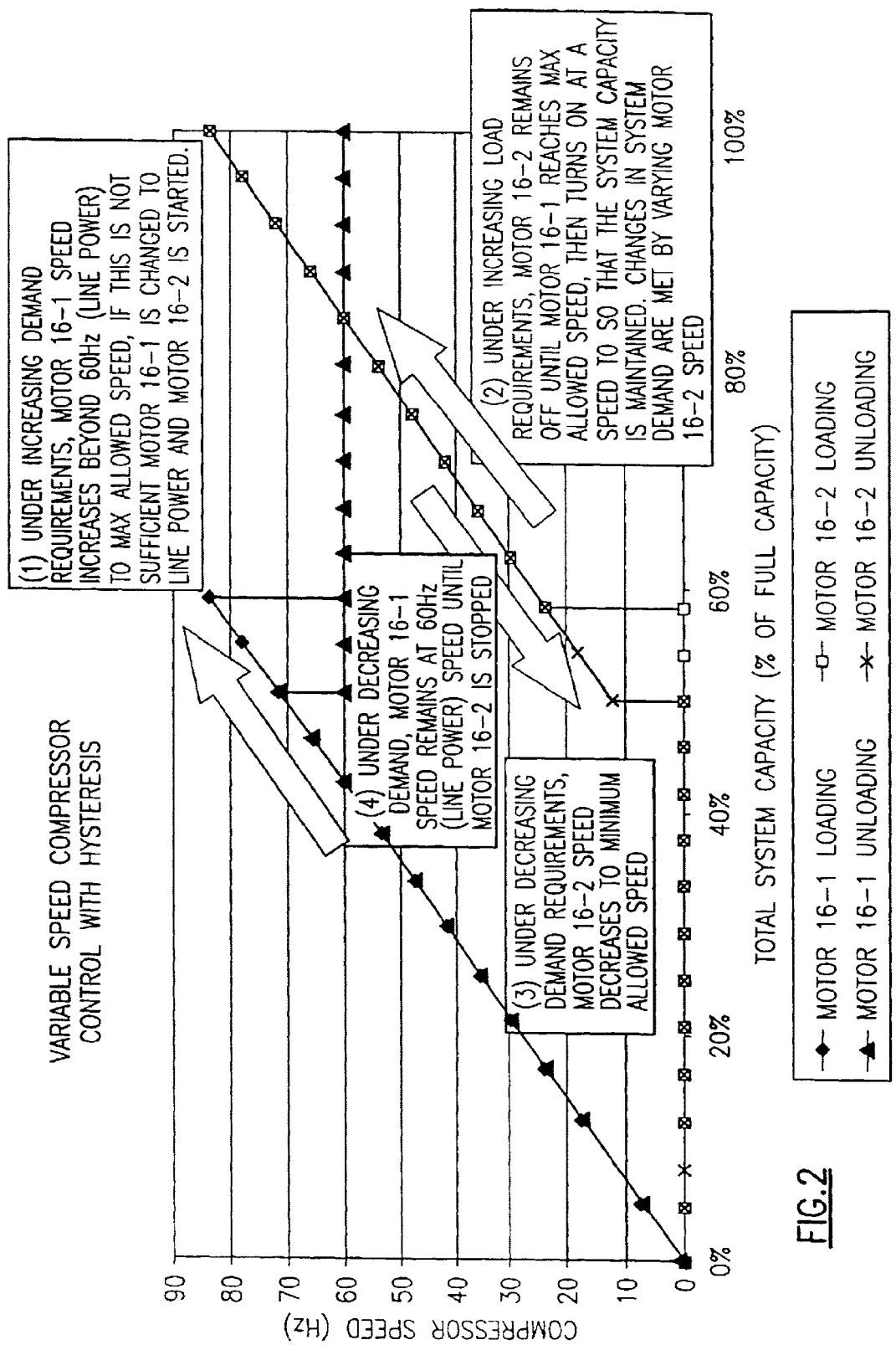
FIG. 2 is an illustration of a typical loading algorithm that includes hysteresis necessary for preventing the short cycling of the compressor motors.

There is shown in FIG. 2 a typical loading algorithm for including this hysteresis. The control algorithm for Circuit 18 includes hysteresis to avoid short cycling the compressor motors. In this manner a system load requirement such as 110% of a compressor capacity, which are difficult to achieve using a subsequent compressor at variable speed, due to such low capacity demand, is achieved by overspeeding the compressor prior to switching it to line speed. Accordingly, if for example, 60 Hz is each compressor's nominal speed, and the system demand requires additional capacity equivalent to an additional 6 Hz (see FIG. 2, text box (1)), instead of immediately placing the first compressor on line power and running the second at 10%, the first compressor motor 16-1 is caused to overspeed to 66 Hz and as the demand gets higher and the variable speed compressor reaches its maximum allowed operating speed, the first compressor motor 16-1 is dropped in speed by switching to line power and the second variable speed compressor is added to the circuit (see FIG. 2, text box (2)) at a speed that meets the required system load. The second compressor motor 16-2 is brought on to a speed which is higher than its minimum allowed speed, this allows for the system load to immediately drop off without requiring the second compressor to be immediately shut down. This pattern is reversed as demand decreases (see FIG. 2, text boxes (3) and (4)) and while shown in FIG. 2 for two motors, is easily applicable to three or more.

It should be understood that the compressor motor speeds indicated herein are by way of example only and depending on the compressor size, type and system used, these actual speeds will differ.

Referring to FIG. 1 and FIG. 2 (particularly text boxes (3) and (4) thereof), in operation, as the load approaches the total capacity of the unit, the system will have all of the compressors 17 running on line power except for the last compressor started, for example 16-3. This last motor will continue to run on VSD power until the load on the system begins to diminish. As the load diminishes, motor 16-3 reduces in speed until it is no longer needed to satisfy the load. At this time motor 16-3 is turned off by opening switch 14-3, and another motor, for example 16-2, is changed from line power to VSD power by opening switch 20-2 and closing switch 14-2. Given a minimum compressor speed requirement of greater than zero, motor 16-3 will be shut down before its speed decreases all the way to zero. When this compressor 17-3 is shut down, the first compressor may need to increase its speed beyond the nominal 60 Hz, this allows for the system load to immediately increase without requiring the second compressor to be immediately restarted. This method of capacity reduction continues until no motors are operating on line power and only one motor is operating on VSD power. Any number of compressor motors can be effectively controlled in this manner through the use of a single VSD.

A primary advantage of this invention is that a multiple compressor system is provided having a single variable speed drive for loading and unloading compressors based on demand, which can provide a better match between system capacity and load.

Another advantage of this invention is that a lower cost, less complex variable speed compressor system is provided, having multiple compressors and motors controlled by a single variable speed drive, such that the VSD need only be sized to provide sufficient power for the largest single motor that may be run from it.

Yet another advantage of the this invention is that a mechanism is provided for maintaining the desired combined load during the unloading of one compressor motor to line power and loading of a second to variable speed, while reducing the likelihood of short cycling of the motors.

Although the present invention has been specifically illustrated and described as applicable to compressor systems (screw, reciprocating, rotary, scroll, etc) capable of running effectively under variable speed control, the invention is also generic to the type of variable speed drive hardware used and thus is applicable to any type of variable speed drive. It is therefore intended that the present invention is to be limited only by the scope of the appended claims.

What is claimed is:

1. A system for variable speed control of motors under variable load demand, comprising:

a constant power source;

a plurality of motors connected with said constant power source and having an electric circuit, wherein each of said motors operates in at least one of constant speed mode and in variable speed mode;

means for driving at least one of said plurality of motors in said variable speed mode, wherein each of said plurality of motors is connected with said means for driving through said electric circuit;

each of said plurality of motors selectively electrically connected with said means for driving and said constant power for driving said each of said plurality of motors at one of variable and constant speed in response to system load demands;

control of said electric circuit includes hysteresis when switching from variable speed mode to constant speed mode; and control of said electric circuit includes hysteresis when switching from constant speed mode to variable speed mode.

2. The system according to claim 1, wherein said means for driving is a single variable speed drive.

3. The system according to claim 2, wherein said means for driving is electrically connected with only one of said plurality of motors at a time.

4. The system according to claim 3, wherein each of said plurality of motors which is not electrically connected with said variable speed drive is electrically connected with said constant power source or is disconnected from all power sources.

5. The system according to claim 1, wherein each of said plurality of motors powers a compressor of one of an air conditioning and refrigeration system.

6. The system according to claim 5, wherein said means for driving is a single variable speed drive.

7. The system according to claim 6, wherein said means for driving is electrically connected with only one of said plurality of motors at a time.

8. The system according to claim 7, wherein each of said plurality of motors which is not electrically connected with said variable speed drive is electrically connected with said constant power source or is disconnected from all power sources.

* * * * *